United States Patent
Stanley

(10) Patent No.: US 10,061,369 B2
(45) Date of Patent: *Aug. 28, 2018

(54) AUTOMATICALLY ENABLING INFORMATION TO BE DISPLAYED AFTER A PROCESSOR-BASED SYSTEM IS TURNED OFF

(75) Inventor: Randy P. Stanley, Aptos, CA (US)

(73) Assignee: Intel Corporation, Santa Clara, CA (US)

( * ) Notice: Subject to any disclaimer, the term of this patent is extended or adjusted under 35 U.S.C. 154(b) by 1405 days.

This patent is subject to a terminal disclaimer.

(21) Appl. No.: 12/080,735

(22) Filed: Apr. 3, 2008

(65) Prior Publication Data

US 2008/0196044 A1    Aug. 14, 2008

Related U.S. Application Data

(63) Continuation of application No. 09/450,261, filed on Nov. 29, 1999, now abandoned.

(51) Int. Cl.
  *G06F 15/16* (2006.01)
  *G06F 1/32* (2006.01)

(52) U.S. Cl.
  CPC .......... *G06F 1/3203* (2013.01); *G06F 1/3293* (2013.01); *Y02D 10/122* (2018.01)

(58) Field of Classification Search
  None
  See application file for complete search history.

(56) References Cited

U.S. PATENT DOCUMENTS

| | | | |
|---|---|---|---|
| 5,392,390 A | | 2/1995 | Crozire |
| 5,396,637 A | * | 3/1995 | Harwell et al. ............... 365/228 |
| 5,664,228 A | * | 9/1997 | Mital .............................. 710/62 |
| 5,705,977 A | * | 1/1998 | Jones ......................... 340/457.2 |
| 5,768,163 A | | 6/1998 | Smith, II |
| 5,796,577 A | | 8/1998 | Ouchi et al. |
| 5,797,089 A | * | 8/1998 | Nguyen ........................ 455/403 |
| 5,832,489 A | | 11/1998 | Kucala |
| 5,878,282 A | * | 3/1999 | Mital .............................. 710/62 |
| 5,884,186 A | | 3/1999 | Hidaka |
| 5,907,815 A | | 5/1999 | Grimm et al. |
| 5,920,728 A | | 7/1999 | Hallowell et al. |
| 5,926,623 A | * | 7/1999 | Tsukakoshi et al. ......... 709/200 |
| 6,047,260 A | | 4/2000 | Levinson |
| 6,205,021 B1 | * | 3/2001 | Klein et al. .............. 361/679.17 |

(Continued)

OTHER PUBLICATIONS

Stanley, Randy "Automatically Enabling Information to Be Displayed After a Processor-Based System Is Turned Off", Final Office Action received for U.S. Appl. No. 13/097,910, dated Jul. 6, 2012, 13 pages.

(Continued)

*Primary Examiner* — Kenny S Lin
(74) *Attorney, Agent, or Firm* — Jordan IP Law, LLC

(57) ABSTRACT

A system enables personal information manager (PIM) applications to continue to provide alerts and other time sensitive information even when the system upon which the PIM is stored is turned off. Automatically data may be transferred from a first processor-based system to a second processor-based system to implement time sensitive activities. The second processor-based system may provide a user notification at a predetermined time preset on the first processor-based system.

16 Claims, 4 Drawing Sheets

(56) References Cited

U.S. PATENT DOCUMENTS

| | | | |
|---|---|---|---|
| 6,208,996 B1 | 3/2001 | Ben-Shachar et al. | |
| 6,209,011 B1 | 3/2001 | Vong et al. | |
| 6,219,694 B1 | 4/2001 | Lazaridis et al. | |
| 6,243,831 B1 * | 6/2001 | Mustafa et al. | 714/24 |
| 6,259,932 B1 | 7/2001 | Constien | |
| 6,266,295 B1 | 7/2001 | Parker et al. | |
| 6,334,046 B1 | 12/2001 | Philipson et al. | |
| 6,339,795 B1 * | 1/2002 | Narurkar et al. | 709/246 |
| 6,356,956 B1 | 3/2002 | Deo et al. | |
| 6,367,074 B1 | 4/2002 | Bates et al. | |
| 6,412,689 B1 | 7/2002 | Horiguchi et al. | |
| 6,496,949 B1 | 12/2002 | Kanevsky et al. | |
| 6,538,880 B1 * | 3/2003 | Kamijo et al. | 361/679.4 |
| 6,571,281 B1 | 5/2003 | Nickerson | |
| 6,587,675 B1 | 7/2003 | Riddiford | |
| 6,728,812 B1 * | 4/2004 | Kato | 710/303 |
| 7,047,038 B1 | 5/2006 | Macor | |

OTHER PUBLICATIONS

Stanley, Randy "Automatically Enabling Information to Be Displayed After a Processor-Based System Is Turned Off", Final Office Action received for U.S. Appl. No. 13/097,910, dated May 9, 2013, 13 pages.

Stanley, Randy "Automatically Enabling Information to Be Displayed After a Processor-Based System Is Turned Off", Non-Final Office Action Received for U.S. Appl. No. 09/450,261, dated Aug. 19, 2002, 9 pages.

Notice of Allowance received for U.S. Appl. No. 13/097,910, dated Mar. 20, 2014, 6 pages.

Office Action received for U.S. Appl. No. 13/097,910 , dated Oct. 10, 2013, 2005, 19 pages.

Padwick et al., "Using Microsoft Outlook 98", Que, 1998, pp. 40-44, 453-455, 540-541.

\* cited by examiner

US 10,061,369 B2

AUTOMATICALLY ENABLING INFORMATION TO BE DISPLAYED AFTER A PROCESSOR-BASED SYSTEM IS TURNED OFF

CROSS-REFERENCE TO RELATED APPLICATION

This application is a continuation of U.S. patent application Ser. No. 09/450,261, filed Nov. 29, 1999 now abandoned.

BACKGROUND

This invention relates generally to processor-based systems and in some particular embodiments to processor-based systems which maintain time sensitive information such as scheduling information for the user.

A personal information manager (PIM) application such as Microsoft Outlook, Lotus Organizer and Sidekick may provide a calendar, notes, a to do list, electronic mail and so forth. Much of this information is time sensitive. For example, an alert may be programmed to signal the user at a particular time to take a certain course of action, such as to attend a meeting or to make a phone call. The alert may be accompanied by a display which displays the time sensitive act.

One problem with such systems is that if the user turns his or her processor-based system off, the user will miss the notification. Thus, conventionally, turning the computer off disables the system from providing the predetermined notice at the predetermined time.

Of course, the processor-based system user may overcome this problem by simply leaving his or her computer always on. However, this practice is not recommended and may greatly drain the power resources of the processor-based system. Thus, conventionally users turn their processor-based systems off when not being used. When they do so, they risk the possibility that they will miss important alerts.

Thus, there is a need for ways which enable a user to be advised of time sensitive information when the user's personal computer is in a powered-off state.

SUMMARY

In accordance with one aspect, a method includes automatically transferring time sensitive data from a storage coupled to a first processor-based device to a storage coupled to the second processor-based device. The time sensitive data is automatically displayed on a display coupled to a second processor-based device at a predetermined time.

Other aspects are set forth in the accompanying detailed description and claims.

DETAILED DESCRIPTION

Figure 1:
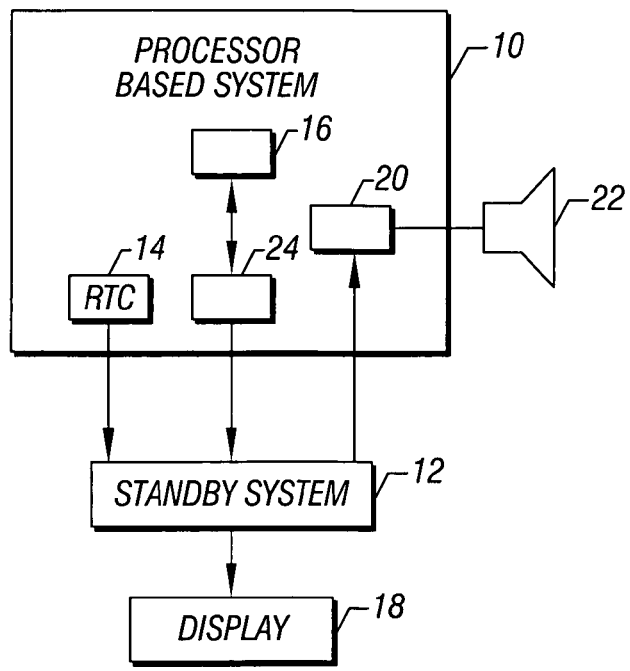
FIG. 1 is a schematic depiction of one embodiment of the present invention.

Referring to FIG. 1, a processor-based system 10 may be coupled to a standby system 12. In one embodiment of the present invention, the processor-based system 10 and the standby system 12 may be contained within the same housing. Thus, the user may not appreciate that two distinct processor-based systems are provided.

The processor-based system 10 may be any conventional computer system, including a laptop or portable computer system operable from a battery. The processor-based system 10 may include a real time clock (RTC) 14 and an information manager application 16 such as a personal information manager (PIM) application. A driver 20 may drive a speaker 22 in accordance with one embodiment of the present invention. An application program 24 may act as an interface between the application 16 and the standby system 12.

While the present invention is described in connection with an embodiment in which a personal information management (PIM) application utilized, the present application is applicable to systems which involve time sensitive data which may come in a variety of different types of information including time information and time sensitive alerts as additional examples. Thus, it is not essential that the information be associated with a PIM application in particular.

The standby system 12 may be coupled to the processor-based system 10 by an appropriate link. In embodiments in which separate housings are utilized for the systems 10 and 12, a tethered connection may be provided between the systems 10 and 12. In other embodiments, the systems 10 and 12 may be coupled by a airwave communication link, such as a infrared link, a radio link or a cellular telephone link.

In some embodiments of the present invention, the standby system 12 may use the same power supply as the system 12. In the case where the processor-based system 10 is run from a battery, the standby system 12 may also be operated from the same battery. In addition, in some embodiments, the standby system 12 may be coupled to the real time clock 14 of the processor-based system 10 so that timing is synchronized between the two systems.

The processor-based system 10 may store an application 16, such as a scheduler, a calendar or the like which may receive time sensitive data such as the time for appointments, telephone calls or the like. The application 16 may be user programmed to give a visible or audible alert at a preprogrammed time. In order to ensure that this information is always available for notification to the user, the application 16 information may be transferred to the standby system 12.

This transfer of application 16 information may be implemented in a variety of ways. It may be implemented automatically in response to an indication that the processor-based system 10 is about to be powered off. Alternatively, every time a given type of information is stored on the processor-based system 10 in association with the application 16, that information may be automatically transferred to the standby system 12. For example, whenever the user sets an alert to audibly or visibly notify the user of a given event, information about that alert may automatically be transferred to the standby system 12. As still another embodiment, the information associated with the application 16 may automatically be transferred at periodic intervals to the standby system 12.

In each case, the expectation is that by automatically transferring the time sensitive data from the processor-based system 10 to the system 12, upon power off of the system 10, the data may still be available on the system 12. The system 12 may include a display 18 in one embodiment of the present invention that may be operated even when the processor-based system 10 is in its power off state. In addition, the standby system 12 may operate the driver 20 and speaker 22 to provide an audible indication, at a predetermined time, in keeping with the information provided by the application 16. In other embodiments of the present invention, the standby system 12 may include its own speaker 22.

Through the standby system 12 that is always powered on, the user may be notified of an important activity or event that is stored in his or her application 16. Alternatively, the system 12 may be automatically powered on whenever the processor-based system 10 is about to be powered off. Thus, one of the two systems 10 or 12 is always in a powered on state ready to provide time sensitive data, in one embodiment of the invention.

Figure 2:
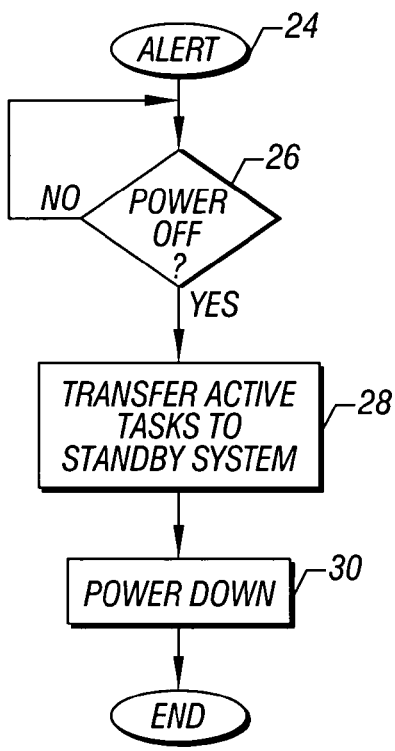
FIG. 2 is a flow chart showing software in accordance with one embodiment of the present invention which may be provided as part of the processor-based system shown in FIG. 1.

Referring to FIG. 2, in accordance with one embodiment of the present invention, software 24 may be stored on the processor-based system 10, for example a hard disk drive. The flow begins by determining when a power off state is about to occur as indicated in diamond 26. In such case, any active application 16 task may be transferred to the standby system 12 as indicated in block 28. Thus, events of a particular type may automatically be transferred from the system 10 to the system 12 prior to shut down of the system 10. The software 24 may extract time sensitive alerts from PIM applications in one embodiment of the invention.

For example, pre-programmed alerts which are designed to notify the user of a given event may be transferred to the standby system 12 prior to shut off. After transferring the information, the processor-based system 10 may proceed to a power off state, as indicated in block 30.

In other embodiments of the present invention, as described previously, the transfer of time sensitive data to the standby system 12 may be done automatically whenever events of a certain type are preprogrammed. Alternatively, the data may be periodically automatically transferred to the standby system 12.

In some embodiments of the present invention, the power consumption of the standby system 12 may be considerably less than that encountered with the overall system 10. Thus, power may be reasonably conserved.

Figure 3:
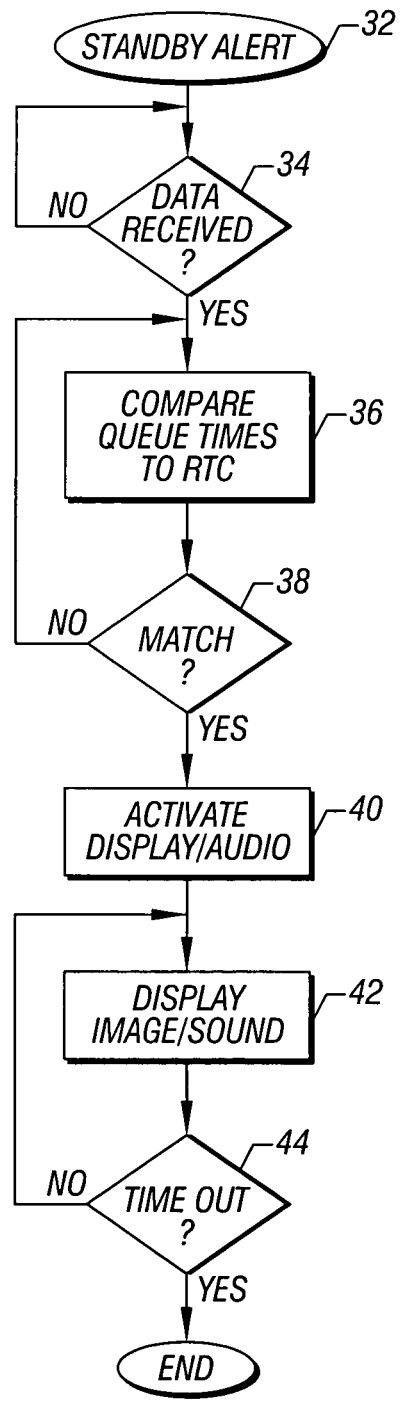
FIG. 3 is a flow chart showing software which may be run by the standby system shown in FIG. 1.

Turning now to FIG. 3, software 32 may be stored on the standby system 12 in accordance with one embodiment of the present invention. The software 32 may monitor for PIM application 16 information, as indicated in diamond 34. When PIM information or other time sensitive data is transferred, the standby system 12 may be activated automatically. The system 12 may compare the time of the time sensitive data, such as a PIM alert, contained in a queue containing one or more time sensitive events, to the information about the current time from the real time clock 14, as indicated in block 36. When there is a match, as indicated in diamond 38, an audio or visible display may be activated as indicated in block 40. In one such case, an image of the calendar, produced by the PIM application 16, may be displayed on a display 18 or a sound may be produced, for example from the speaker 22, to alert the user (block 42). After a time out is reached, as indicated in diamond 44, the flow may be terminated.

Figure 4:
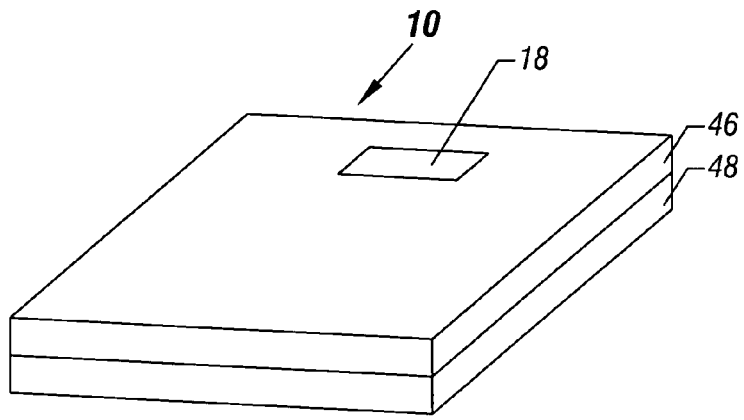
FIG. 4 is a perspective view of one embodiment of the present invention.

Turning next to FIG. 4, in accordance with one embodiment of the present invention, the system 10 may be a laptop or portable computer which includes within its housing the system 10 and the standby system 12. The laptop may include a display portion 46 that folds onto a keyboard portion 48. The display 18 may be provided on the exterior of the housing of the system 10, for example on the portion 46. Thus, even though the system 10 is in its closed configuration and is powered off, the user may be notified, for example through the display 18 on the exterior of the housing, of alerts and other time sensitive events.

Figure 5:
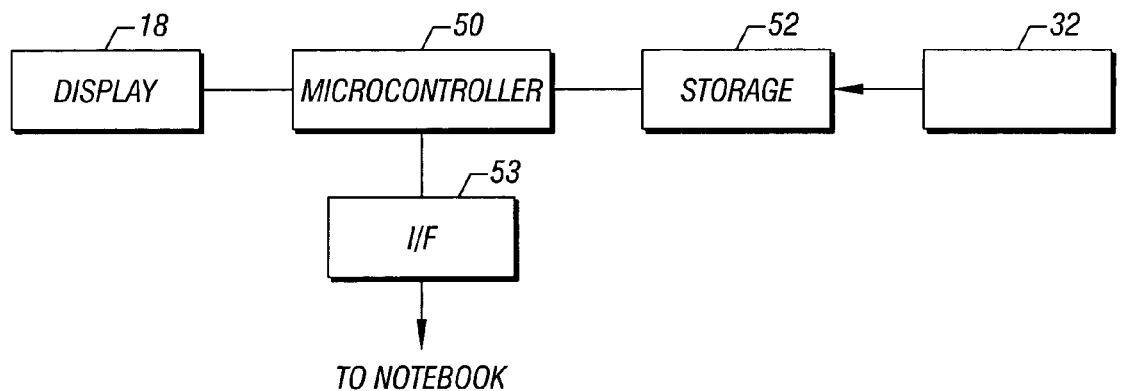
FIG. 5 is a block diagram of the standby system shown in FIG. 1 in accordance with one embodiment of the present invention.

In accordance with one embodiment of the present invention, the standby system 12 may be implemented by a microcontroller 50 which is coupled to the display 18 and to a storage 52, as shown in FIG. 5. For example, in one embodiment of the present invention, the storage 52 may store the software 32. The microcontroller 50 may also be coupled to an interface 53 which in turn may be coupled to the processor-based system 10. In this way, the systems 10 and 12 may exchange information such as the real time clock information, PIM information and signals to the processor-based system 10 and speaker 22.

In one embodiment of the present invention the system 12 may be a cellular telephone linked to the user's personal computer. On the opposite end of the spectrum, the system 12 may be a server. For example, the system 12 may be an Internet server. When the user is about to turn off his or her computer system 10, for example before going on a trip, the user's time sensitive data may automatically be transferred to a Web site operated by the server. The user can then access the time sensitive data, once stored on the Web site, from a computer different from the one originally used to record the PIM information.

Figure 6:
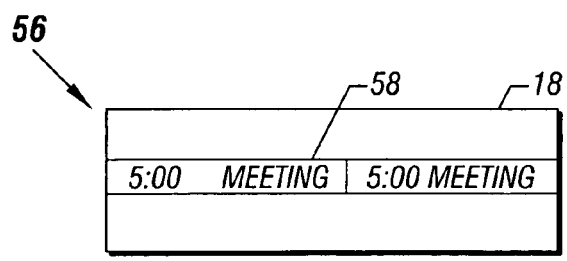
FIG. 6 is a graphical user interface in accordance with one embodiment of the present invention.

Referring to FIG. 6, the display 18, in accordance with one embodiment of the present invention, may display a graphical user interface 56 such as a calendar. Thus, a plurality of times may be displayed, with a particular meeting time 58 highlighted. In one embodiment user definable information may be scrolled across the display 18. Thus, by exporting the time sensitive data from the application 16, the user is provided with a portion of his or her overall calendar and given a visual warning of the timed event.

Figure 7:
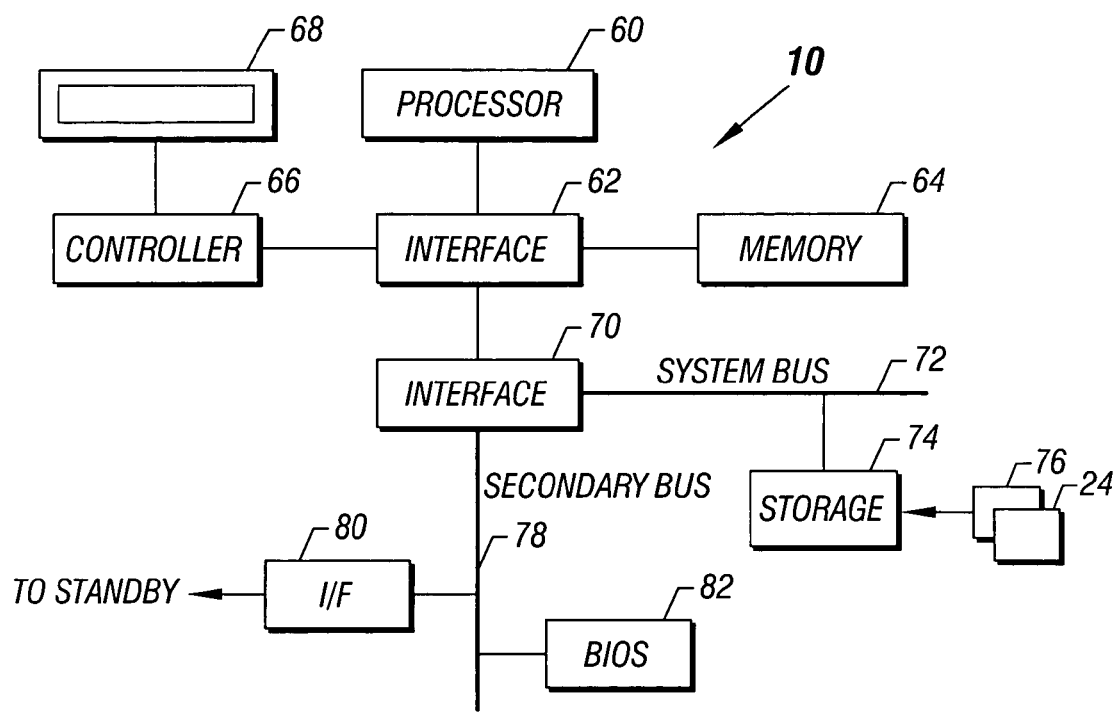
FIG. 7 is a block diagram for one embodiment of the processor-based system 10, shown in FIG. 1.

Turning finally to FIG. 7, the processor-based system 10 may include a processor 60 coupled to an interface 62 such as a bridge. The interface 62 may be coupled to a system memory 64 and a display controller 66. A display 68 may be coupled to a controller 66. An interface 70 may be coupled to the interface 62 as well as to a system bus 72. The real time clock may be part of the interface 70. The system bus 72 may be coupled to a storage medium 74, storing the software 76 for example that implements the PIM functions and the software 24.

In addition, the interface 70 may be coupled to a secondary bus 78 coupled to the interface 80. The interface 80 is coupled to the standby system 12 through its interface 53.

The secondary bus 78 may also couple a BIOS storage 82. The software 24 may be part of the BIOS software stored on the BIOS storage 82.

The storage 74 may define a time sensitive data queue, controlled for example by the application 24, for storing a plurality of time sensitive alerts in accordance with one embodiment to the present invention. The queue may be in the form of a content addressable memory (CAM) with each location associated with a tag indicative of a particular time for action. The queue may be searched to find alerts having a tag indicative of a time that matches the current time, for example obtained from the real time clock.

The application 24 may be responsible for gathering time sensitive data from the application 16, prioritizing that data, ordering the data in the queue and running the queue. The application 24 may also notify the user when the last alert in the queue has been completed.

In some cases, the queue depth may be exceeded, for example because the number of timed entries exceeds the capacity of the queue. In such cases, a notification may be provided to the user that the queue depth has been exceeded and that additional entries may not be accepted. This may be accomplished for example, by a suitable graphical user interface.

In some embodiments of the present invention, it may advantageous to provide the ability to mute the audible notification so that the user is not disturbed when the user is in a meeting or the like. In such cases, the user may enter a command through the processor-based system 10 which mutes any audible alerts until the mute is released. In addition, it may be desirable to provide a interrupt which allows the user to enter a code into the processor-based system 10 to turn off the on-going display, on the display 18, of an alert or upcoming timed event. In addition it may be desirable in some cases to turn off the display 18 at any time when the processor-based system 10 is operational to avoid duplicative indications of time sensitive data.

While the program 24 is illustrated as being an application program, it may also be implemented as part of an operating system. The program 24 may also be part of a personal information manager application as well.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
automatically and selectively transferring time sensitive data associated with a preprogrammed event from a first storage of a first processor-based system to a second storage of a second processor-based system when it is determined that the first processor-based system is being powered off and data associated with the preprogrammed event exists; and
automatically displaying, when the first processor-based system is in a power off state, said transferred data associated with the preprogrammed event on a display of the second processor-based system which is provided on an exterior of a housing of said first processor-based system.

2. The method of claim 1, wherein the first processor-based system including the first storage and the second processor-based system including the second storage are contained within the same housing.

3. The method of claim 1, further comprising powering the second processor-based system using a power source of said first processor-based system when said first processor-based system is powered off.

4. The method of claim 1, further comprising providing real time clock information from said first processor-based system to said second processor-based system.

5. The method of claim 1, wherein said second processor-based system comprises a standby system contained within the housing of the first processor-based system.

6. The method of claim 1, further comprising providing an indication from the second processor-based system at the time associated with the data.

7. A memory storage medium, having instructions, when executed on a personal computer, to perform a method comprising:
automatically and selectively transferring time sensitive data associated with a preprogrammed event from a first storage of the personal computer to a storage of a device when it is determined that the personal computer is entering a reduced power state and data associated with the preprogrammed event exists, wherein the device has a separate processor from the personal computer; and
automatically displaying said transferred data associated with the preprogrammed event on a display of said device when the personal computer is in a power off state, wherein the display of said device is provided on an exterior of a housing of said personal computer.

8. The memory storage medium of claim 7, wherein data associated with a preprogrammed event is periodically automatically transferred from the personal computer storage to the device.

9. The memory storage medium of claim 8, wherein the method further comprises periodically powering on the personal computer so that data associated with a preprogrammed event can be periodically transferred to the device, wherein the device including the storage is contained within a housing of the personal computer.

10. The memory storage medium of claim 7, wherein the method further comprises providing an indication from the second processor-based system at the time associated with the data.

11. A system comprising:
a housing containing a first processor-based system having a first storage, and a second processor-based system having a second storage; and
computer readable medium having instructions for causing a computer to automatically and selectively transfer time sensitive data associated with a preprogrammed event from the first storage to the second storage prior to turning off the first processor-based system and determining data associated with the preprogrammed event exists, and automatically display, when the first processor-based system is in a power off state, said transferred data associated with the preprogrammed event on a display of the second processor-based system which is provided on an exterior of the housing.

12. The system of claim 11, wherein the first processor-based system including the first storage and the second processor-based system including the second storage are contained within the housing.

13. The system of claim 11, further comprising a power source to power the first processor-based system and the second processor-based system.

14. The system of claim 11, further comprising a clock configure to provide clock information to first processor-based system and the second processor-based system.

15. The system of claim 11, wherein the housing includes a keyboard portion and a display portion that folds onto the keyboard portion.

16. The system of claim 15, wherein the display is provided on the exterior of the display portion.

\* \* \* \* \*